United States Patent
Wang et al.

(10) Patent No.: US 11,368,705 B2
(45) Date of Patent: Jun. 21, 2022

(54) VIDEO FEATURE EXTRACTION AND VIDEO CONTENT UNDERSTANDING METHOD, APPARATUS, STORAGE MEDIUM AND SERVER

(71) Applicant: Tencent Technology (Shenzhen) Company Limited, Shenzhen (CN)

(72) Inventors: Bairui Wang, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/893,174

(22) Filed: Jun. 4, 2020

(65) Prior Publication Data

US 2020/0304796 A1 Sep. 24, 2020

Related U.S. Application Data

(63) Continuation of application No. PCT/CN2019/075534, filed on Feb. 20, 2019.

(30) Foreign Application Priority Data

Mar. 5, 2018 (CN) .......................... 201810179638.4

(51) Int. Cl.
*H04N 19/136* (2014.01)
*G06K 9/00* (2022.01)
(Continued)

(52) U.S. Cl.
CPC ......... *H04N 19/503* (2014.11); *G06K 9/6215* (2013.01); *G06V 10/751* (2022.01);
(Continued)

(58) Field of Classification Search
CPC .. H04N 19/503; H04N 19/136; H04N 19/105; H04N 19/172; H04N 21/234336;
(Continued)

(56) References Cited

U.S. PATENT DOCUMENTS

| 8,874,584 | B1 | 10/2014 | Chen et al. |
| 2017/0127016 | A1 | 5/2017 | Yu et al. |

(Continued)

FOREIGN PATENT DOCUMENTS

| CN | 103473555 A | 12/2013 |
| CN | 104113789 A | 10/2014 |

(Continued)

OTHER PUBLICATIONS

Song et al. "Hierarchical LSTMs with Adaptive Attention for Visual Captioning", Journal of Latex Class Files, vol. 14, No. 8, Aug. 2015 (Year: 2015).*

(Continued)

*Primary Examiner* — Susan E. Hodges
(74) *Attorney, Agent, or Firm* — Morgan, Lewis & Bockius LLP

(57) ABSTRACT

Provided are a video processing method and apparatus, a video retrieval method and apparatus, a medium, and a server. The video processing method includes: performing encoding and decoding on an original video by using the encoder and the decoder, to obtain a video feature of the original video and a hidden state of the original video at a decoding stage; reconstructing a video feature of a target video by using the reconstructor according to the hidden state of the original video at the decoding stage; obtaining a difference between the video feature of the target video and the video feature of the original video; and adjusting a processing parameter of at least one of the decoder and the reconstructor to reduce the difference between the video (Continued)

feature of the target video and the video feature of the original video.

21 Claims, 8 Drawing Sheets

(51) Int. Cl.
| | |
|---|---|
| *G06K 9/62* | (2022.01) |
| *H04N 19/503* | (2014.01) |
| *H04N 19/105* | (2014.01) |
| *G06V 10/75* | (2022.01) |
| *G06V 20/40* | (2022.01) |

(52) U.S. Cl.
CPC .............. *G06V 20/41* (2022.01); *G06V 20/47* (2022.01); *H04N 19/105* (2014.11); *H04N 19/136* (2014.11)

(58) Field of Classification Search
CPC .............. H04N 21/2343; H04N 21/44; H04N 21/4402; G06K 9/6202; G06K 9/6215; G06K 9/00718; G06K 9/00751; G06K 9/00744; G06F 16/783; G06F 16/7844
USPC ......................................................... 375/240
See application file for complete search history.

(56) References Cited

U.S. PATENT DOCUMENTS

| | | | |
|---|---|---|---|
| 2017/0150235 A1 | 5/2017 | Mei et al. | |
| 2019/0251360 A1* | 8/2019 | Cricri | ................. G06K 9/00744 |
| 2019/0273510 A1* | 9/2019 | Elkind | ..................... G06F 8/74 |
| 2019/0273948 A1* | 9/2019 | Yin | .......................... G06N 3/08 |
| 2020/0186796 A1* | 6/2020 | Mukherjee | ........... H04N 19/107 |
| 2021/0160522 A1* | 5/2021 | Lee | ...................... H04N 19/117 |

FOREIGN PATENT DOCUMENTS

| | | |
|---|---|---|
| CN | 104185089 A | 12/2014 |
| CN | 105654054 A | 6/2016 |
| CN | 106331711 A | 1/2017 |
| CN | 106845411 A | 6/2017 |
| CN | 107038221 A | 8/2017 |
| CN | 107066973 A | 8/2017 |
| CN | 107391646 A | 11/2017 |
| CN | 108419094 A | 8/2018 |
| WO | WO 2014043340 A1 | 3/2014 |

OTHER PUBLICATIONS

Tencent Technology, WO, PCT/CN2019/075534, Apr. 15, 2019, 5 pgs.
Tencent Technology, IPRP, PCT/CN2019/075534, Sep. 8, 2020, 6 pgs.
Tencent Technology, ISR, PCT/CN2019/075534, Apr. 15, 2019, 2 pgs.
Dashan Guo et al., "Capturing Temporal Structures for Video Captioning by Spatio-temporal Contexts and Channel Attention Mechanism", Neural Processing Letters, Kluwer Academic Publishers, Norwell, MA, vol. 46, No. 1, Jan. 25, 2017, 16 pgs.
Extended European Search Report, 19763983.4, dated Dec. 8, 2021, 9 pgs.
Yujia Zhang et al., "Unsupervised Object-Level Video Summarization with Online Motion Auto-Encoder", Arxiv.Org, Cornell University Library, 201 Olin Library, Cornell University, Ithaca, NY, Jan. 2, 2018, XP080849924, 13 pgs.

* cited by examiner

VIDEO FEATURE EXTRACTION AND VIDEO CONTENT UNDERSTANDING METHOD, APPARATUS, STORAGE MEDIUM AND SERVER

CROSS-REFERENCE TO RELATED APPLICATIONS

This application is a continuation application of PCT Patent Application No. PCT/CN2019/075534, entitled "VIDEO PROCESSING METHOD AND APPARATUS, VIDEO RETRIEVAL METHOD AND APPARATUS, STORAGE MEDIUM AND SERVER" filed on Feb. 20, 2019, which claims priority to Chinese Patent Application No. 201810179638.4, entitled "VIDEO PROCESSING METHOD AND APPARATUS, VIDEO RETRIEVAL METHOD AND APPARATUS, STORAGE MEDIUM, AND SERVER" filed Mar. 5, 2018, all of which are incorporated by reference in their entirety.

FIELD OF THE TECHNOLOGY

This application relates to the field of Internet technologies, specifically, to the field of video processing technologies, and in particular, to a video processing method, a video processing apparatus, a video retrieval method, a video retrieval apparatus, a computer storage medium, and a server.

BACKGROUND OF THE DISCLOSURE

A video content understanding service has emerged to facilitate quick understanding of the main content of videos. The video content understanding service is a service of describing video content with a natural sentence. An important factor of measuring the quality of the video content understanding service is a description accuracy rate of a natural sentence used for describing video content. In the related art, a video processing procedure generally includes an encoding stage and a decoding stage. In the encoding stage, an encoder performs feature extraction on each frame of an original video. In the decoding stage, a decoder predicts a natural sentence used for describing the content of the video according to an extracted video feature. Although the video content understanding service is implemented by using the solution in the related art, only a natural sentence used for describing video content is obtained, and how to improve a description accuracy rate of the natural sentence for the video content is not considered. Consequently, the quality of the video content understanding service cannot be ensured.

SUMMARY

Embodiments of this application provide a video processing method and apparatus, a video retrieval method and apparatus, a storage medium, and a server.

A video processing method is applied to a video processing system, the video processing system including an encoder, a decoder, and a reconstructor, and the method including:

performing encoding and decoding on an original video by using the encoder and the decoder, to obtain a video feature of the original video and a hidden state of the original video at a decoding stage;

reconstructing a video feature of a target video by using the reconstructor according to the hidden state of the original video at the decoding stage;

obtaining a difference between the video feature of the target video and the video feature of the original video; and adjusting a processing parameter of at least one of the decoder and the reconstructor to reduce the difference between the video feature of the target video and the video feature of the original video.

In an embodiment, the video processing method further includes:

determining words corresponding to the original video by using the decoder according to the hidden state of the original video at the decoding stage; and combining the words according to the time sequence of the decoding moments by using the decoder to form a natural sentence used for describing the original video.

A video retrieval method includes:

receiving a video retrieval request, the video retrieval request carrying retrieval key information;

searching a video database for a natural sentence matching the retrieval key information, the video database including a video and a natural sentence corresponding to the video, and the natural sentence corresponding to the video being obtained through processing by using the video processing method for generating a natural sentence; and obtaining a matching video corresponding to the natural sentence matching the retrieval key information, and outputting the matching video.

A video processing apparatus includes:

a processing unit, configured to perform encoding and decoding on an original video by using an encoder and a decoder, to obtain a video feature of the original video and a hidden state of the original video at a decoding stage;

a reconstruction unit, configured to reconstruct a video feature of a target video by using a reconstructor according to the hidden state of the original video at the decoding stage;

a difference obtaining unit, configured to obtain a difference between the video feature of the target video and the video feature of the original video; and an optimization unit, configured to adjust a processing parameter of at least one of the decoder and the reconstructor to reduce the difference between the video feature of the target video and the video feature of the original video.

In an embodiment, the processing unit is further configured to: determine words corresponding to the original video by using the decoder according to the hidden state of the original video at the decoding stage; and combine the words according to the time sequence of the decoding moments by using the decoder to form a natural sentence used for describing the original video.

A video retrieval apparatus includes:

a receiving unit, configured to receive a video retrieval request, the video retrieval request carrying retrieval key information;

a retrieval unit, configured to search a video database for a natural sentence matching the retrieval key information, the video database including a video and a natural sentence corresponding to the video, and the natural sentence corresponding to the video being obtained through processing by using the video processing apparatus for generating a natural sentence;

an obtaining unit, configured to obtain a matching video corresponding to the natural sentence matching the retrieval key information; and an output unit, configured to output the matching video.

A non-transitory computer-readable storage medium storing computer-readable instructions, the computer-readable instructions, when executed by one or more processors, causing the one or more processors to perform the following operations:

performing encoding and decoding on an original video by using an encoder and a decoder, to obtain a video feature of the original video and a hidden state of the original video at a decoding stage;

reconstructing a video feature of a target video by using the reconstructor according to the hidden state of the original video at the decoding stage;

obtaining a difference between the video feature of the target video and the video feature of the original video; and adjusting a processing parameter of at least one of the decoder and the reconstructor to reduce the difference between the video feature of the target video and the video feature of the original video.

In an embodiment, the computer-readable instructions, when executed by the one or more processors, cause the one or more processors to further perform the following operations:

determining words corresponding to the original video by using the decoder according to the hidden state of the original video at the decoding stage; and combining the words according to the time sequence of the decoding moments by using the decoder to form a natural sentence used for describing the original video.

A non-transitory computer-readable storage medium storing computer-readable instructions, the computer-readable instructions, when executed by one or more processors, causing the one or more processors to perform the following operations:

receiving a video retrieval request, the video retrieval request carrying retrieval key information;

searching a video database for a natural sentence matching the retrieval key information, the video database including a video and a natural sentence corresponding to the video, and the natural sentence corresponding to the video being obtained by performing operations in the video processing method for generating a natural sentence; and obtaining a matching video corresponding to the natural sentence matching the retrieval key information, and outputting the matching video.

A server including a memory and a processor, the memory storing computer-readable instructions, and the computer-readable instructions, when executed by the processor, causing the processor to perform the following operations:

performing encoding and decoding on an original video by using an encoder and a decoder, to obtain a video feature of the original video and a hidden state of the original video at a decoding stage;

reconstructing a video feature of a target video by using the reconstructor according to the hidden state of the original video at the decoding stage;

obtaining a difference between the video feature of the target video and the video feature of the original video; and adjusting a processing parameter of at least one of the decoder and the reconstructor to reduce the difference between the video feature of the target video and the video feature of the original video.

In an embodiment, the computer-readable instructions, when executed by the one or more processors, cause the one or more processors to further perform the following operations:

determining words corresponding to the original video by using the decoder according to the hidden state of the original video at the decoding stage; and combining the words according to the time sequence of the decoding moments by using the decoder to form a natural sentence used for describing the original video.

A server including a memory and a processor, the memory storing computer-readable instructions, and the computer-readable instructions, when executed by the processor, causing the processor to perform the following operations:

receiving a video retrieval request, the video retrieval request carrying retrieval key information;

searching a video database for a natural sentence matching the retrieval key information, the video database including a video and a natural sentence corresponding to the video, and the natural sentence corresponding to the video being obtained by performing operations in the video processing method for generating a natural sentence; and obtaining a matching video corresponding to the natural sentence matching the retrieval key information, and outputting the matching video.

Details of one or more embodiments of this application are provided in the accompany drawings and description below. Other features, objectives, and advantages of this application become apparent from the specification, the accompanying drawings, and the claims.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may derive other drawings from the accompanying drawings without creative efforts.

DESCRIPTION OF EMBODIMENTS

The following clearly and completely describes the technical solutions in the embodiments of this application with reference to the accompanying drawings in the embodiments of this application.

A video content understanding service has emerged to facilitate quick understanding of the main content of videos. The so-called video content understanding service is performing a series of encoding and decoding processing such as video feature extraction and video content understanding on a video, to eventually generate a natural sentence used for describing video content. In other words, the video content understanding service is a service of describing video content with a natural sentence. The video content understanding service may be applied to a plurality of Internet scenarios. For example, the video content understanding service may be applied to a categorization scenario in which videos are categorized based on natural sentence descriptions of the videos on a video website. For another example, the video content understanding service may further be applied to a retrieval scenario of a video website in which videos are retrieved based on natural sentence descriptions of the videos, and may further be combined with a voice retrieval system to convert natural sentences of videos into voice for output to help the visually impaired perform video retrieval.

Figure 1:
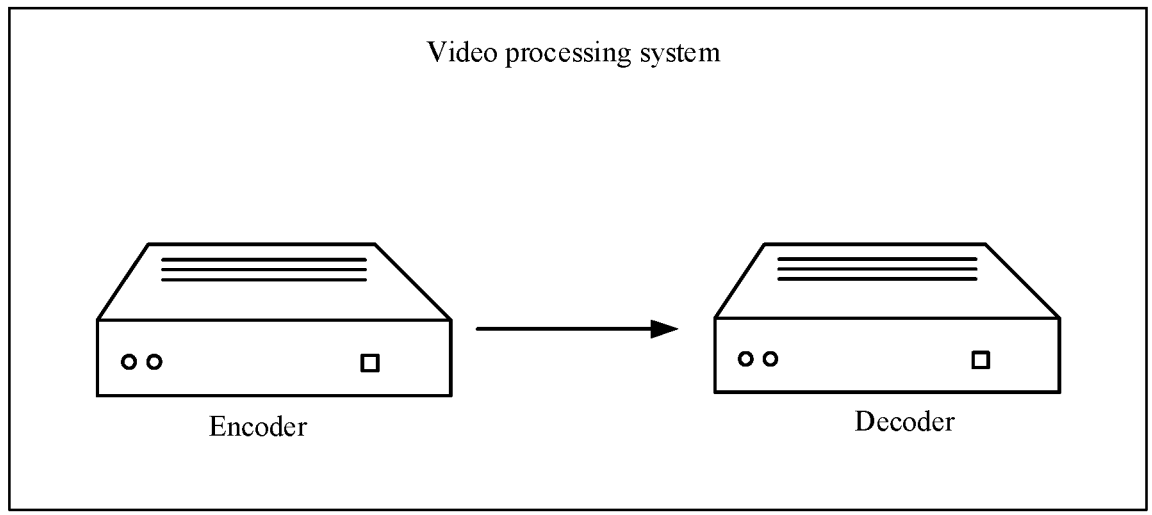
FIG. 1 is a schematic structural diagram of the framework of an existing video processing system.

An important factor of measuring the quality of the video content understanding service is a description accuracy rate of a natural sentence used for describing video content. A higher description accuracy rate of the natural sentence indicates a higher matching degree between content expressed by the natural sentence and the video content, so that the quality of the video content understanding service is improved, and user experience is better. Conversely, a lower description accuracy rate of the natural sentence indicates a lower matching degree between the content expressed by the natural sentence and the video content, so that the quality of the video content understanding service is lowered, and the user experience is poorer. In a conventional solution, a video processing system shown in FIG. 1 is used for implementing the video content understanding service. Referring to FIG. 1, a framework structure of the video processing system is mainly formed by an encoder and a decoder. Correspondingly, an existing video processing procedure includes an encoding stage and a decoding stage. In the encoding stage, the encoder performs feature extraction on each frame of an original video. In the decoding stage, an extracted frame feature is transformed in a manner such as an average feature mechanism or an attention mechanism, and the decoder then predicts a natural sentence used for describing the content of the video according to a transformed video feature. It may be seen from the foregoing video processing solution that, in the conventional solution, the decoder generates the natural sentence by using the video feature outputted by the encoder. However, in the natural sentence generated by using the conventional solution, a description accuracy rate of the natural sentence for video content may be affected because partial semantics of the video content are neglected, and the quality of the video content understanding service is affected as a result.

Figure 2:
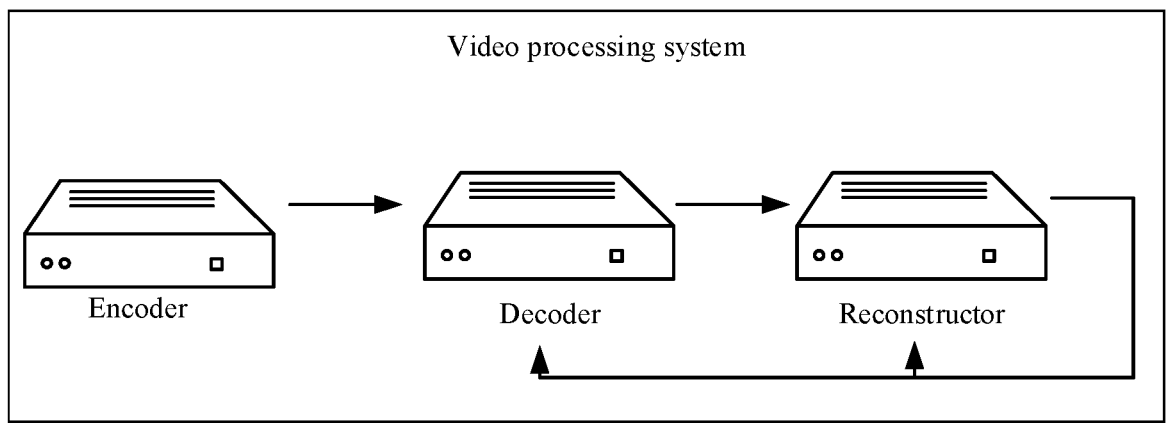
FIG. 2 is a schematic structural diagram of the framework of a video processing system according to an embodiment of this application.

Based on this, the embodiments of this application provide such a concept of a video processing system: a description accuracy rate of a natural sentence for video content is improved by using both forward information from the video content to the natural sentence and backward information from the natural sentence to the video content, that is, by using bilateral information, thereby improving the quality of the video content understanding service. A specific principle is as follows: since a natural sentence used for describing content of an original video can be generated by performing a series of processing on the content of the original video, conversely, the content of the original video can be restored by preforming a series of processing on the generated natural sentence. If a difference between the restored content and the content of the original video is relatively small (for example, less than a preset threshold), it indicates that the generated natural sentence is a relatively accurate description of the content of the original video. Otherwise, it indicates that the generated natural sentence is not an adequately accurate description of the content of the original video. Based on this principle, the video processing system provided in this embodiment of this application introduces a reconstructor configured to reconstruct and restore the video content based on the conventional solution. Referring to FIG. 2 together, the video processing system in an embodiment of this application includes an encoder, a decoder, and a reconstructor. The encoder, the decoder, and the reconstructor may be specifically devices formed by hardware, or may be implemented in the form of computer programs. The computer programs may be run on a server shown in FIG. 10 or may further be jointly implemented by combining software and hardware. In the subsequent embodiments of this application, the original video is a to-be-described video that is originally inputted into the encoder, and a target video is an inputted video that is reconstructed and restored by the reconstructor according to the natural sentence obtained through decoding. Based on the video processing system shown in FIG. 2, there are mainly four stages in a video processing procedure in this embodiment of this application, including an encoding stage, a decoding stage, a reconstruction stage, and an optimization stage. The stages are specifically as follows:

1. Encoding Stage:

An original video is inputted into the encoder, and the encoder performs feature extraction on each frame of the original video, to obtain a frame feature sequence. The frame feature sequence may also be referred to as a video feature of the original video. Generally, the encoder may perform feature extraction based on a convolutional neural network (CNN).

In an embodiment, an example in which the encoder performs feature extraction based on a CNN Inception-V4 is used. For an original video including m (m is a positive integer) frames, the encoder may obtain a feature $v_i$ of each frame through extraction by using the CNN Inception-V4, and the feature $v_i$ is a feature vector of 1536 dimensions. Therefore, a frame feature sequence $V=\{v_1, v_2 \ldots v_m\}$ may be eventually obtained.

2. Decoding Stage:

After the frame feature sequence V of the original video is obtained, the frame feature sequence may be transformed in a manner such as an average feature mechanism or an attention mechanism, and a video feature obtained through transformation is then inputted into the decoder. The decoder predicts words at a plurality of decoding moments according to the video feature, and combines the words at the decoding moments according to a time sequence to generate a natural sentence used for describing content of the original video.

The average feature mechanism is performing integration and transformation on the frame feature sequence according to a method of calculating an average feature. In this embodiment of this application, the frame feature sequence V is integrated based on the average feature mechanism, and the integrated video feature may be expressed by the following Formula (1):

$$C = \frac{1}{m}\sum_{i=1}^{m} v_i \qquad (1)$$

The attention mechanism, also referred to as an attention model, is widely applied to various types of deep learning tasks such as natural language processing, image recognition, and voice recognition, and greatly improves the deep learning tasks. The attention mechanism may include a spatial attention mechanism and a temporal attention mechanism. In an encoding and decoding processing framework of videos, the temporal attention mechanism is applied more widely. During specific implementation, the system performance in sequence-to-sequence natural language processing can be effectively improved either by introducing the attention mechanism into an encoder framework to perform weighted transformation on a source sequence or by introducing the attention mechanism into a decoder framework to perform weighted transformation on a target sequence. In this embodiment of this application, the frame feature sequence V is integrated based on the temporal attention mechanism, and the integrated video feature may be expressed by the following Formula (2):

$$C = \sum_{i=1}^{m} \alpha_i v_i \qquad (2)$$

$$\sum_{i=1}^{m} \alpha_i = 1$$

In the foregoing Formula (2), $\alpha_i$ indicates a dynamic weight of the frame feature $v_i$. It may be known from the foregoing Formula (2) that, the temporal attention mechanism allocates one weight to each frame feature, and an integrated feature is obtained by performing weighted addition on all frame features.

Generally, the decoder may predict the natural sentence by using a recursive neural network (RNN). In an embodiment, a recurrent neural network of a long short-term memory (LSTM) (referred to as an LSTM network for short below) and an example in which the frame feature sequence is transformed by using the temporal attention mechanism are used for description. Assuming that the natural sentence that is generated by the decoder and is used for describing the content of the original video is represented by S. The length of the natural sentence S is n (n is a positive integer), and the value of n may be set according to an actual requirement. For example, it is set that n=30, which indicates that the length of the natural sentence S is 30 words long. For another example, it is set that n=25, which indicates that the length of the natural sentence S is 25 words long. Because the length of the natural sentence S is n, it indicates that the decoder performs a total of n times of decoding processing in the decoding stage. Each time of decoding processing needs to predict one word. That is, the decoder obtains a word $s_1$ through prediction at a decoding moment $t_1$, and obtains a word $s_2$ through prediction at a decoding moment $t_2$. The rest is deduced by analogy, and a word $s_n$ is obtained through prediction at a decoding moment $t_n$. In other words, in the decoding stage, the decoder obtains a word $s_k$ through prediction at any decoding moment $t_k$ (k is a positive integer, and 1≤k≤n). Therefore, the natural sentence obtained by the decoder through prediction is S={$s_1, s_2, \ldots s_k, \ldots s_n$}. In this case, a specific processing procedure of the decoding stage in this embodiment of this application is as follows:

To capture global time information in the original video, every time the decoder predicts a word, the frame feature sequence V is integrated once by using the temporal attention mechanism. For specific integration processing, refer to the foregoing Formula (2). However, in the decoding stage in this embodiment of this application, when the time attention model allocates a weight to each frame at a current decoding moment, the factor of a hidden state of the LSTM network of the decoder at a previous decoding moment further needs to be considered. Therefore, integrated features obtained by performing integration at the decoding moments may be different. Therefore, the foregoing Formula (2) may be transformed into the following Formula (3):

$$C_{t_k} = \sum_{i=1}^{m} \alpha_i^{t_k} v_i \qquad (3)$$

$$\sum_{i=1}^{m} \alpha_i^{t_k} = 1$$

In the foregoing Formula (3), $C_{t_k}$ indicates an integrated feature obtained at any decoding moment $t_k$, and $\alpha_i^{t_k}$ indicates a dynamic weight allocated to a frame feature $v_i$ at a decoding moment $t_k$. The integrated feature obtained at each decoding moment is inputted into the decoder, and the decoder predicts a word at each decoding moment according to the inputted integrated feature. For a process in which the decoder predicts a word, refer to the following Formula (4):

$$P(s_k|s_{<k}, V, \theta) \propto \exp(f(s_{k-1}, h_k, c_{t_k}, \theta)) \qquad (4)$$

$s_k \in S = \{s_1, s_2, \ldots s_k \ldots, s_n\}$ indicates the $k^{th}$ word in the natural sentence S, $s_{<k}$ indicates some words that have been obtained through prediction in the natural sentence S, and $\theta$ indicates a processing parameter of the decoder. P( ) indicates a probability of the word $s_k$ obtained through prediction at a current decoding moment, exp( ) indicates an exponential function, and $h_k$ indicates the $k^{th}$ hidden state of the LSTM network of the decoder. f( ) indicates an activation function of the LSTM network of the decoder. It may be known from the foregoing Formula (4) that, in the decoding stage, the decoder can predict a probability of the word $s_k$ at any decoding moment $t_k$, at the same time obtain the hidden state $h_k$ of the LSTM network of the decoder at any decoding moment $t_k$, and combine obtained hidden states at a plurality of decoding moments according to a time sequence of the decoding moments, to obtain a hidden state of the original video at the decoding stage, which is also referred to as a hidden state sequence H={$h_1, h_2, \ldots h_k, \ldots h_n$} of the original video at the decoding stage.

3. Reconstruction Stage:

The hidden state sequence H of the original video at the decoding stage is transformed in a manner such as an average feature mechanism or an attention mechanism, the transformed hidden state is inputted into the reconstructor, and the reconstructor reconstructs a feature of a target video according to the transformed hidden state.

In an embodiment, the reconstructor may reconstruct a feature of an inputted video based on a deep neural network.

The deep neural network herein may include, but is not limited to, a CNN and a recurrent neural network. An LSTM network is used as an example. The hidden state sequence H of the original video at the decoding stage is used as an input of an LSTM network of the reconstructor, and a global feature and/or local features of the target video may be reconstructed. The global feature herein is a feature jointly reflected by all video frames, and the local features are several frame features.

In an embodiment, the reconstructor may reconstruct a global feature of the target video.

First, to reconstruct the global feature of the target video, the reconstructor needs to fully consider hidden states the original video in the decoding stage at all decoding moments. Corresponding to the n times of decoding processing performed by the decoder in the decoding stage, in the reconstruction stage, the reconstructor needs to perform n times of reconstruction processing. It is assumed that a reconstruction moment is $t_j$ where j is a positive integer, and $1 \leq j \leq n$. It may be seen that, the reconstruction moment $t_j$ corresponds to the decoding moment $t_k$. A correspondence herein is that: a global feature of the target video at a reconstruction moment $t_1$ may be reconstructed by using a hidden state $h_1$ at a decoding moment $t_1$; a global feature of the target video at a reconstruction moment $t_2$ may be reconstructed by using a hidden state $h_2$ at a decoding moment $t_2$; similarly, a global feature of the target video at a reconstruction moment $t_n$ may be reconstructed by using a hidden state $h_n$ at a decoding moment $t_n$. It may be known from the above, a global feature of the target video at the reconstruction moment $t_j$ may be reconstructed by using the hidden state $h_k$ at any decoding moment $t_k$. In this case, j and k have the same value. In this embodiment of this application, the hidden state sequence H of the original video at the decoding stage may be integrated based on the average feature mechanism, and the global expression information of the natural sentence predicted by the decoder may be obtained, which is shown in the following Formula (5).

$$\phi(H) = \frac{1}{n}\sum_{j=1}^{n} h_j \tag{5}$$

In Formula (5), $\phi(H)$ indicates an average feature of the hidden states of the decoder at the decoding moments.

$\phi(H)$, the hidden state $h_j$ of the original video at the decoding stage corresponding to the current reconstruction moment $t_j$, and a hidden state $z_{j-1}$ of the reconstructor at a previous reconstruction moment $t_{j-1}$ are then used as inputs of the LSTM network of the reconstructor, and a hidden state $z_j$ of the reconstructor at the current reconstruction moment $t_j$ is obtained. For this process, refer to the following Formula (6):

$$\begin{pmatrix} i_{t_j} \\ f_{t_j} \\ o_{t_j} \\ g_{t_j} \end{pmatrix} = \begin{pmatrix} \sigma \\ \sigma \\ \sigma \\ \tanh \end{pmatrix} T \begin{pmatrix} h_j \\ z_{j-1} \\ \phi(H) \end{pmatrix} \tag{6}$$

$$m_{t_j} = f_{t_j} \square m_{t_{j-1}} + i_{t_j} \square g_{t_j}$$

$$z_j = o_{t_j} \square \tanh(m_{t_j})$$

In the foregoing Formula (6), $i_{t_j}$, $f_{t_j}$, $o_{t_j}$, and $g_{t_j}$ are respectively referred to as an input gate, a forget gate, a memory gate, and an output gate. tanh( ) is a hyperbolic tangent function, and $\sigma$ is a common activation function, such as the sigmoid function, in a neural network. $z_j$ not only indicates the hidden state of the reconstructor at the current reconstruction moment $t_j$, but also indicates the global feature of the target video reconstructed by the reconstructor at the current reconstruction moment $t_j$.

In an embodiment, the reconstructor may reconstruct local features of the target video.

First, the reconstructor needs to reconstruct a feature, that is, a frame feature, of each video frame in the target video including m (m is a positive integer) frames. The local features of the target video include the frame feature. In other words, when the local features of the target video are reconstructed, the reconstructor needs to perform m times of reconstruction processing. In this case, it is assumed that a reconstruction moment is $t_j$, where j is a positive integer, and $1 \leq j \leq m$. It is assumed that the reconstructor obtains a frame feature $z_1$ through reconstruction at a reconstruction moment $t_1$, and obtains a frame feature $z_2$ through reconstruction at a reconstruction moment $t_2$. The rest is deduced by analogy, and the reconstructor obtains a frame feature $z_m$ through reconstruction at a reconstruction moment $t_m$. The hidden state sequence of the original video at the decoding stage is transformed based on the temporal attention mechanism, and a process of the transformation is specifically: at each reconstruction moment, every time the reconstructor performs reconstruction processing of a frame feature, performing transformation once on the hidden state sequence of the decoder by using the temporal attention mechanism. In this process, local expression information of the natural sentence obtained by the decoder through prediction may be obtained, that is, text information $\mu_{t_j}$ of the current reconstruction moment $t_j$ is obtained, where $$\mu_{t_j} = \sum_{j=1}^{m} \beta_j^{t_j} h_j \tag{7}$$

$$\sum_{j=1}^{m} \beta_j^{t_j} = 1$$

$\mu_{t_j}$, the hidden state $z_{j-1}$ of the reconstructor at the previous reconstruction moment $t_{j-1}$ are then used as inputs of the LSTM network of the reconstructor, and a hidden state $z_j$ of the reconstructor at the current reconstruction moment $t_j$ is obtained. The process may be represented by the following Formula (8):

$$\begin{pmatrix} i_{t_j} \\ f_{t_j} \\ o_{t_j} \\ g_{t_j} \end{pmatrix} = \begin{pmatrix} \sigma \\ \sigma \\ \sigma \\ \tanh \end{pmatrix} T \begin{pmatrix} \mu_{t_j} \\ z_{t_{j-1}} \end{pmatrix} \tag{8}$$

$$m_{t_j} = f_{t_j} \square m_{t_{j-1}} + i_{t_j} \square g_{t_j}$$

$$z_{t_j} = o_{t_j} \square \tanh(m_{t_j})$$

In the foregoing Formula (8), $z_{t_j}$ not only indicates the hidden state of the reconstructor at the current reconstruction moment $t_j$ but also indicates one frame feature of the target video reconstructed by the reconstructor at the current reconstruction moment $t_j$.

4. Optimization Stage:

A feature of the target video is compared with a feature of the original video that is originally inputted. If a difference between the two features is relatively small (for example, less than a preset threshold), it indicates that the natural sentence generated by the decoder is a relatively accurate description of video content of the original video. Conversely, if the difference between the two features is relatively large (for example, greater than the preset threshold), it indicates that the natural sentence generated by the decoder is not an adequately accurate description of video content of the original video. In such a scenario, processing parameters of the decoder and/or the reconstructor may be optimized and trained based on the difference between the two parameters, so that the difference between the two parameters is gradually reduced. In this process, backward information from the natural sentence to the video content is used for constraining the generation of the natural sentence by the decoder. With continuous optimization, an entire framework network of the video processing system tends to be stable, and the generated natural sentence describes the video content more accurately.

In an embodiment, the server may construct a global loss function $L_{rec}^g$ of the reconstructor by using a Euclidean distance between the global feature of the original video and the global feature of the target video, which is represented by:

$$L_{rec}^g = \varphi(\phi(V), \phi(Z)) \qquad (9)$$

In the foregoing Formula (9), Z indicates a global feature sequence of an inputted video that is reconstructed, where $Z=\{z_1, z_2, \ldots z_n\}$. $\varphi(\ )$ indicates calculating the Euclidean distance.

In an embodiment, the server may construct a local loss function $L_{rec}^l$ of the reconstructor by using an average Euclidean distance between video frame features of the constructed target video and frame features of the original video, which is represented by:

$$L_{rec}^l = \frac{1}{m}\sum_{i=1}^{m}\varphi(z_i, v_i) \qquad (10)$$

Because a difference function of the entire video processing system is formed by a loss function of the decoder and a loss function of the reconstructor, the loss function of the decoder is combined with the loss function of the reconstructor, so that an expression of the difference function of the entire video processing system may be obtained as follows:

$$L(\theta, \theta_{rec}) = \sum_{i=1}^{n}(-\log P(S_i | V_i; \theta)) + \lambda L_{rec}(V, Z; \theta_{rec}) \qquad (11)$$

In the foregoing Formula (11), $\theta_{rec}$ indicates a processing parameter of the reconstructor. $\lambda$ is an empirical parameter used for balancing the impact of a loss of the reconstructor on the entire video processing system, and the value of $\lambda$ may be set according to actual experience. When the global feature of the target video is reconstructed according to experience, $L_{rec}(V,Z;\theta_{rec})$ in the foregoing Formula (11) is replaced with Formula (9), and the value of $\lambda$ may be set to 0.2. When the local features of the target video are reconstructed, $L_{rec}(V,Z;\theta_{rec})$ in the foregoing Formula (11) is replaced with Formula (10), and the value of $\lambda$ may be set to 0.1.

In conclusion, the foregoing Formula (11) reflects a difference between the feature of the original video and the feature of the target video. An effect of the optimization stage is to optimize and train the entire framework network of the video processing system, and the constantly reduced difference reflected in Formula (11), thereby constraining the generation of the natural sentence, to enable the description accuracy rate of the natural sentence to be higher. It may be known from Formula (11) that the difference is mainly affected by the processing parameter $\theta$ of the decoder and the processing parameter $\theta_{rec}$ of the reconstructor. A process of the optimization stage is training the processing parameter of the decoder and/or the processing parameter of the reconstructor based on the difference function in the foregoing Formula (11), so that a result of Formula (11) is less than a preset threshold, to reduce the difference.

It may be understood that, according to Formula (11), it may be known that an optimization target of the decoder in the optimization training process is $$\min_{\theta}\sum_{i=1}^{n}(-\log P(S_i | V_i; \theta)).$$

In this embodiment of this application, forward information from video content to a natural sentence is used to perform encoding and decoding processing on an original video to obtain the natural sentence, backward information from the natural sentence to the video content is used to obtain a video feature of the original video and a hidden state of the original video at a decoding stage to reconstruct a target video, and the framework of a video processing system is optimized based on a difference between the target video and the original video. In this way, a process of generating a natural sentence is constrained by obtaining bilateral information between video content and the natural sentence, so that a description accuracy rate of the natural sentence is improved, and the quality of the video content understanding service is optimized.

Figure 3:
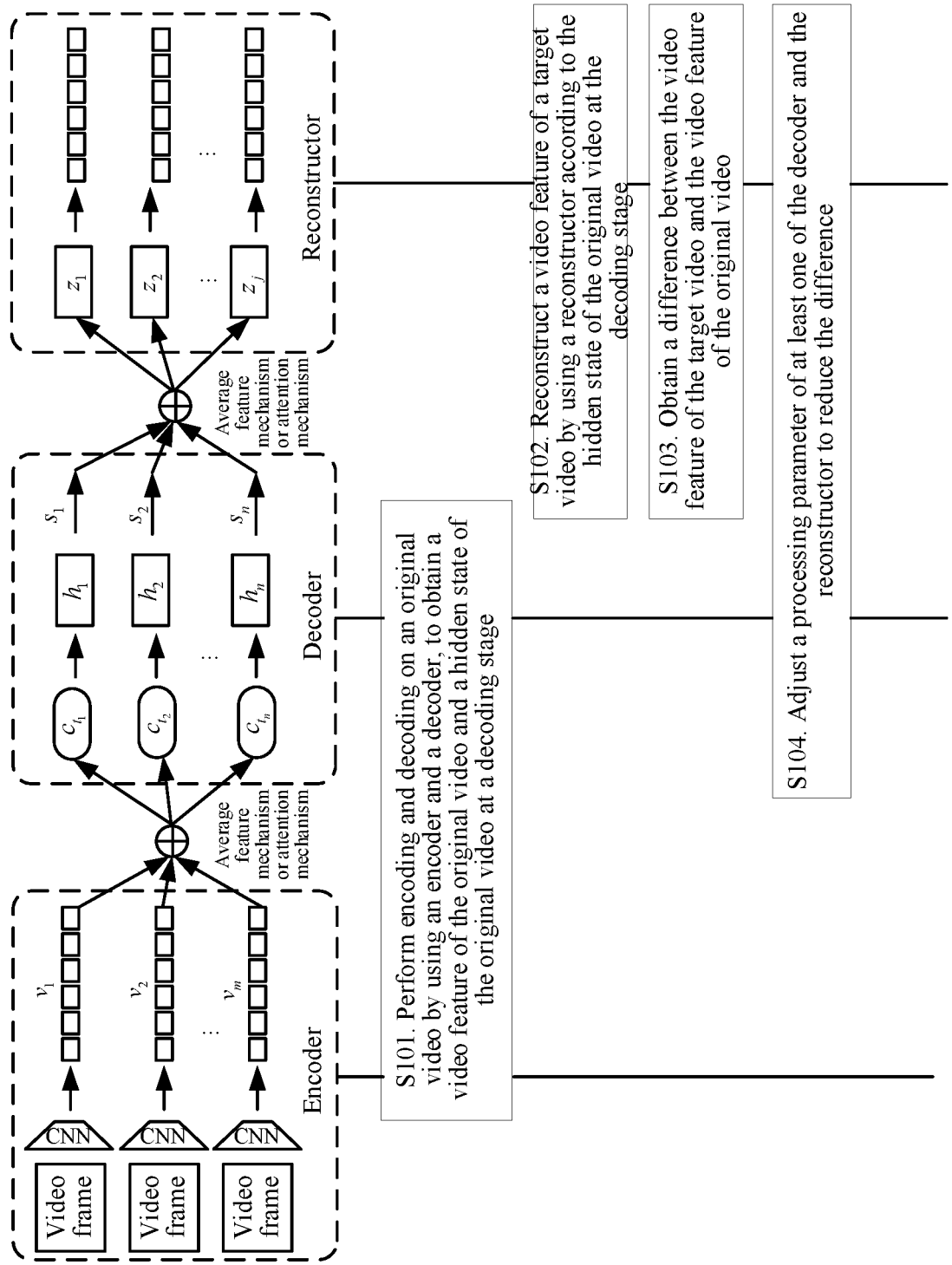
FIG. 3 is a flowchart of a video processing method according to an embodiment of this application.

Based on the foregoing description, an embodiment of this application provides a video processing method. The method may be applied to the video processing system shown in FIG. 2. Referring to FIG. 3, the method may include the following steps S101 to S104.

S101. Perform encoding and decoding processing on an original video by using an encoder and a decoder, to obtain a video feature of the original video and a hidden state of the original video at a decoding stage.

S102. Reconstruct a video feature of a target video by using a reconstructor according to the hidden state of the original video at the decoding stage.

S103. Obtain a difference between the video feature of the target video and the video feature of the original video.

S104. Adjust a processing parameter of at least one of the decoder and the reconstructor according to the difference, to reduce the difference.

In this embodiment of this application, forward information from video content to a natural sentence is used to perform encoding and decoding processing on an original video to obtain a natural sentence, backward information from the natural sentence to the video content is used to obtain a video feature of the original video and a hidden state of the original video at a decoding stage to reconstruct a target video, and the framework of a video processing system is optimized based on a difference between the target video and the original video. In this way, a process of generating a natural sentence is constrained by obtaining bilateral information between video content and the natural sentence, so that a description accuracy rate of the natural sentence is improved, and the quality of the video content understanding service is optimized.

Figure 4:
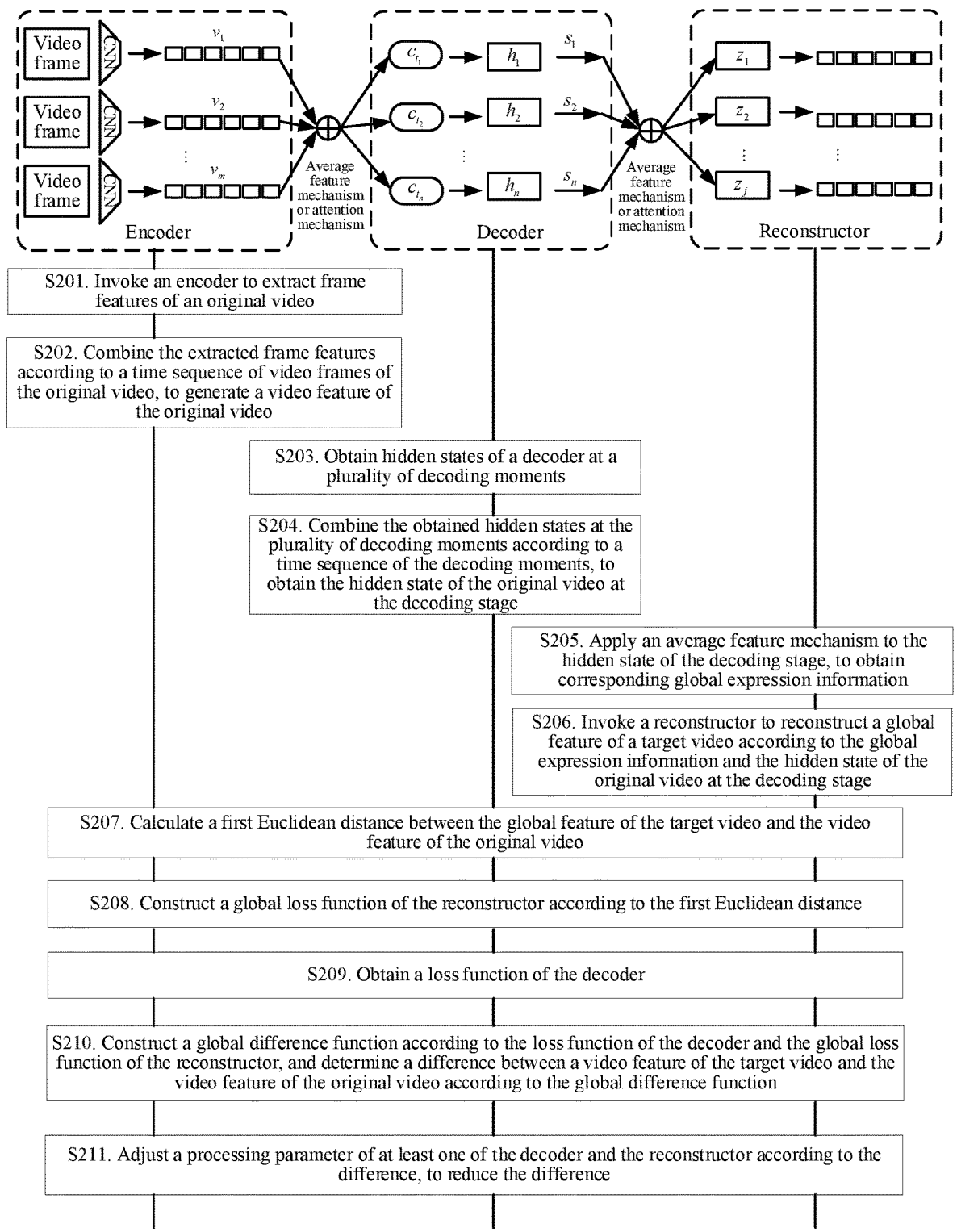
FIG. 4 is a flowchart of another video processing method according to an embodiment of this application.

An embodiment of this application provides another video processing method. The method may be applied to the video processing system shown in FIG. 2. Referring to FIG. 4, the method may include the following steps S201 to S211.

S201. Invoke an encoder to extract frame features of an original video.

S202. Combine the extracted frame features according to a time sequence of video frames of the original video, to generate a video feature of the original video.

S203. Obtain hidden states of a decoder at a plurality of decoding moments.

Step S203 may include the following steps s11 and s12.

s11. Integrate the frame features in the video feature of the original video based on an average feature mechanism or a temporal attention mechanism at each decoding moment, to obtain an integrated feature.

s12. Invoke the decoder to perform decoding processing on the integrated feature, to obtain the hidden states of the decoder at the plurality of decoding moments.

S204. Combine the obtained hidden states at the plurality of decoding moments according to a time sequence of the decoding moments, to obtain the hidden state of the original video at the decoding stage.

S205. Apply an average feature mechanism to the hidden state of the original video at the decoding stage, to obtain corresponding global expression information.

S206. Invoke a reconstructor to reconstruct a global feature of a target video according to the global expression information and the hidden state of the original video at the decoding stage.

S207. Calculate a first Euclidean distance between the global feature of the target video and the video feature of the original video.

S208. Construct a global loss function of the reconstructor according to the first Euclidean distance.

S209. Obtain a loss function of the decoder.

S210. Construct a global difference function according to the loss function of the decoder and the global loss function of the reconstructor, and determine a difference between a video feature of the target video and the video feature of the original video according to the global difference function.

S211. Adjust a processing parameter of at least one of the decoder and the reconstructor according to the difference, to reduce the difference.

In this embodiment of this application, forward information from video content to a natural sentence is used to perform encoding and decoding processing on an original video to obtain a natural sentence, backward information from the natural sentence to the video content is used to obtain a video feature of the original video and a hidden state of the original video at a decoding stage to reconstruct a target video, and the framework of a video processing system is optimized based on a difference between the target video and the original video. In this way, a process of generating a natural sentence is constrained by obtaining bilateral information between video content and the natural sentence, so that a description accuracy rate of the natural sentence is improved, and the quality of the video content understanding service is optimized.

Figure 5:
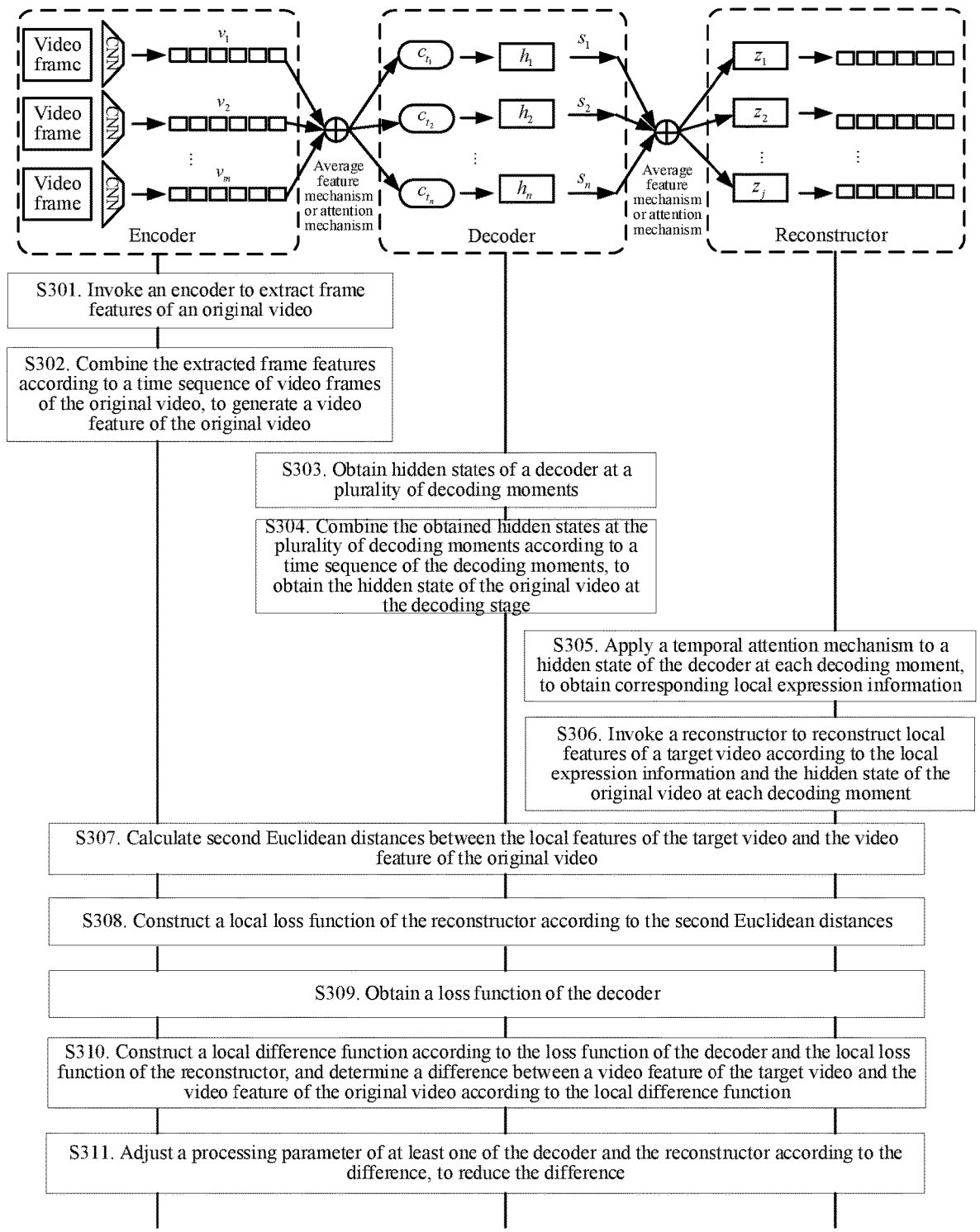
FIG. 5 is a flowchart of still another video processing method according to an embodiment of this application.

An embodiment of this application provides still another video processing method. The method may be applied to the video processing system shown in FIG. 2. Referring to FIG. 5, the method may include the following steps S301 to S311.

S301. Invoke an encoder to extract frame features of an original video.

S302. Combine the extracted frame features according to a time sequence of video frames of the original video, to generate a video feature of the original video.

S303. Obtain hidden states of a decoder at a plurality of decoding moments.

S304. Combine the obtained hidden states at the plurality of decoding moments according to a time sequence of the decoding moments, to obtain the hidden state of the original video at the decoding stage.

S305. Apply a temporal attention mechanism to a hidden state of the decoder at each decoding moment, to obtain corresponding local expression information.

S306. Invoke a reconstructor to reconstruct local features of a target video according to the local expression information and the hidden state of the decoder at each decoding moment.

S307. Calculate second Euclidean distances between the local features of the target video and the video feature of the original video.

S308. Construct a local loss function of the reconstructor according to the second Euclidean distances.

S309. Obtain a loss function of the decoder.

S310. Construct a local difference function according to the loss function of the decoder and the local loss function of the reconstructor, and determine a difference between a video feature of the target video and the video feature of the original video according to the local difference function.

S311. Adjust a processing parameter of at least one of the decoder and the reconstructor according to the difference, to reduce the difference.

In this embodiment of this application, forward information from video content to a natural sentence is used to perform encoding and decoding processing on an original video to obtain a natural sentence, backward information from the natural sentence to the video content is used to obtain a video feature of the original video and a hidden state of the original video at a decoding stage to reconstruct a target video, and the framework of a video processing system is optimized based on a difference between the target video and the original video. In this way, a process of generating a natural sentence is constrained by obtaining bilateral information between video content and the natural sentence, so that a description accuracy rate of the natural sentence is improved, and the quality of the video content understanding service is optimized.

Although each step of the flowcharts in FIG. 3 to FIG. 5 is displayed sequentially according to arrows, the steps are not necessarily performed according to an order indicated by arrows. Unless explicitly specified in this application, the sequence of the steps is not strictly limited, and the steps may be performed in other sequences. In addition, at least some steps in FIG. 3 to FIG. 5 may include a plurality of substeps or a plurality of stages. The substeps or the stages are not necessarily performed at a same moment, and instead may be performed at different moments. A performing sequence of the substeps or the stages is not necessarily performing in sequence, and instead may be performing in turn or alternately with another step or at least some of substeps or stages of the another step.

Figure 6:
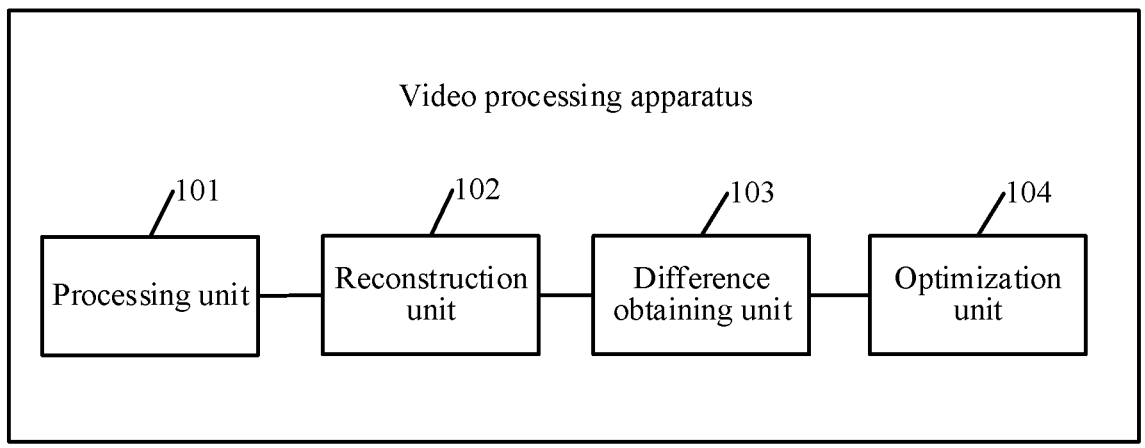
FIG. 6 is a schematic structural diagram of a video processing apparatus according to an embodiment of this application.

Based on descriptions in the embodiments of the video processing system and the video processing method, an embodiment of this application further discloses a video processing apparatus. The video processing apparatus may be a computer program (including program code) run on a server. The video processing apparatus may be applied to the video processing methods in the embodiments shown in FIG. 3 to FIG. 5, so as to perform the steps in the video processing methods. Referring to FIG. 6, the video processing apparatus includes the following units:

a processing unit 101, configured to perform encoding and decoding processing on an original video by using an encoder and a decoder, to obtain a video feature of the original video and a hidden state of the original video at a decoding stage;

a reconstruction unit 102, configured to reconstruct a video feature of a target video by using a reconstructor according to the hidden state of the original video at the decoding stage;

a difference obtaining unit 103, configured to obtain a difference between the video feature of the target video and the video feature of the original video; and an optimization unit 104, configured to adjust a processing parameter of at least one of the decoder and the reconstructor according to the difference, to reduce the difference.

In an embodiment, the processing unit 101 is specifically configured to: invoke the encoder to extract frame features of the original video; combine the extracted frame features according to a time sequence of video frames of the original video, to generate the video feature of the original video; obtain hidden states of the decoder at a plurality of decoding moments; and combine the obtained hidden states at the plurality of decoding moments according to a time sequence of the decoding moments, to obtain the hidden state of the original video at the decoding stage.

In an embodiment, the processing unit 101 is specifically configured to: integrate the frame features in the video feature of the original video based on an average feature mechanism or a temporal attention mechanism at each decoding moment, to obtain an integrated feature; and invoke the decoder to perform decoding processing on the integrated feature, to obtain the hidden states of the decoder at the plurality of decoding moments.

In an embodiment, the video feature of the target video includes a global feature of the target video, and the reconstruction unit 102 is specifically configured to: apply an average feature mechanism to the hidden state of the original video at the decoding stage, to obtain corresponding global expression information; and invoke the reconstructor to reconstruct the global feature of the target video according to the global expression information and the hidden state of the original video at the decoding stage.

In an embodiment, the difference obtaining unit 103 is specifically configured to: calculate a first Euclidean distance between the global feature of the target video and the video feature of the original video; construct a global loss function of the reconstructor according to the first Euclidean distance; obtain a loss function of the decoder; construct a global difference function according to the loss function of the decoder and the global loss function of the reconstructor; and determine the difference between the video feature of the target video and the video feature of the original video according to the global difference function.

In an embodiment, the reconstruction unit 102 is specifically configured to: apply a temporal attention mechanism to a hidden state of the decoder at each decoding moment, to obtain corresponding local expression information; and invoke the reconstructor to reconstruct local features of the target video according to the local expression information and the hidden state of the decoder at each decoding moment.

In an embodiment, the difference obtaining unit 103 is specifically configured to: calculate second Euclidean distances between the local features of the target video and the video feature of the original video; construct a local loss function of the reconstructor according to the second Euclidean distances; obtain a loss function of the decoder; and determine the difference between the video feature of the target video and the video feature of the original video according to a local difference function.

In an embodiment, the optimization unit 104 is specifically configured to: optimize and update the processing parameter of the decoder according to the difference; and/or optimize and update the processing parameter of the reconstructor according to the difference.

In an embodiment, the processing unit is further configured to: determine words corresponding to the original video by using the decoder according to the hidden state of the original video at the decoding stage; and combine the words according to the time sequence of the decoding moments by using the decoder to form a natural sentence used for describing the original video.

According to an embodiment of this application, steps S101 to S104 involved in the video processing method shown in FIG. 3 may be performed by the units in the video processing apparatus shown in FIG. 6. For example, steps S101, S102, S103, and S104 shown in FIG. 3 may be respectively performed by the processing unit 101, the reconstruction unit 102, the difference obtaining unit 103, and the optimization unit 104 shown in FIG. 6.

According to an embodiment of this application, steps S201 to S211 involved in the video processing method shown in FIG. 4 may be performed by the units in the video processing apparatus shown in FIG. 6. For example, steps S201 to S204, S205 and S206, S207 to S210, and S211 shown in FIG. 4 may be respectively performed by the processing unit 101, the reconstruction unit 102, the difference obtaining unit 103, and the optimization unit 104 shown in FIG. 6.

According to an embodiment of this application, steps S201 to S211 involved in the video processing method shown in FIG. 5 may be performed by the units in the video processing apparatus shown in FIG. 6. For example, steps S301 to S304, S305 and S306, S307 to S310, and S311 shown in FIG. 5 may be respectively performed by the processing unit 101, the reconstruction unit 102, the difference obtaining unit 103, and the optimization unit 104 shown in FIG. 6.

In an embodiment, the units in the video processing apparatus shown in FIG. 6 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. During actual application, a function of one unit may be implemented by a plurality of units, or functions of a plurality of units are implemented by one unit. In other embodiments of this application, the video processing apparatus may also include other units. During actual application, the functions may also be cooperatively implemented by other units and may be cooperatively implemented by a plurality of units.

In this embodiment of this application, forward information from video content to a natural sentence is used to perform encoding and decoding processing on an original video to obtain a natural sentence, backward information from the natural sentence to the video content is used to obtain a video feature of the original video and a hidden state of the original video at a decoding stage to reconstruct a target video, and the framework of a video processing system is optimized based on a difference between the target video and the original video. In this way, a process of generating a natural sentence is constrained by obtaining bilateral information between video content and the natural sentence, so that a description accuracy rate of the natural sentence is improved, and the quality of the video content understanding service is optimized.

Figure 7:
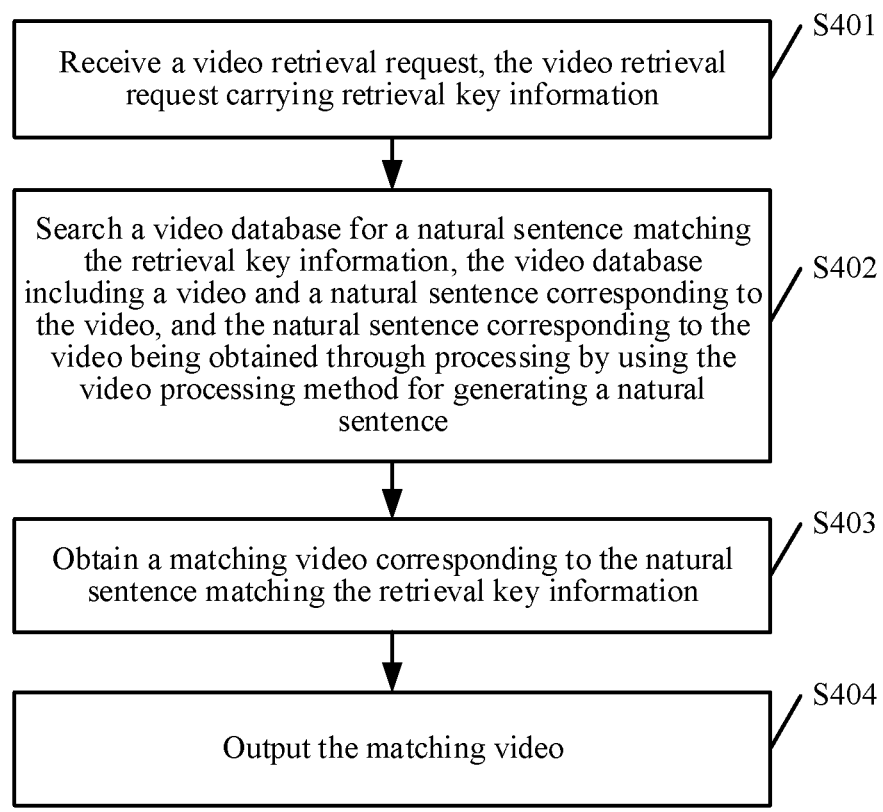
FIG. 7 is a flowchart of a video retrieval method according to an embodiment of this application.

Based on descriptions in the embodiments of the video processing system, the video processing method, and the video processing apparatus, an embodiment of this application further discloses a video retrieval method. Referring to FIG. 7, the method may include the following steps S401 to S404.

S401. Receive a video retrieval request, the video retrieval request carrying retrieval key information.

Figure 8A:
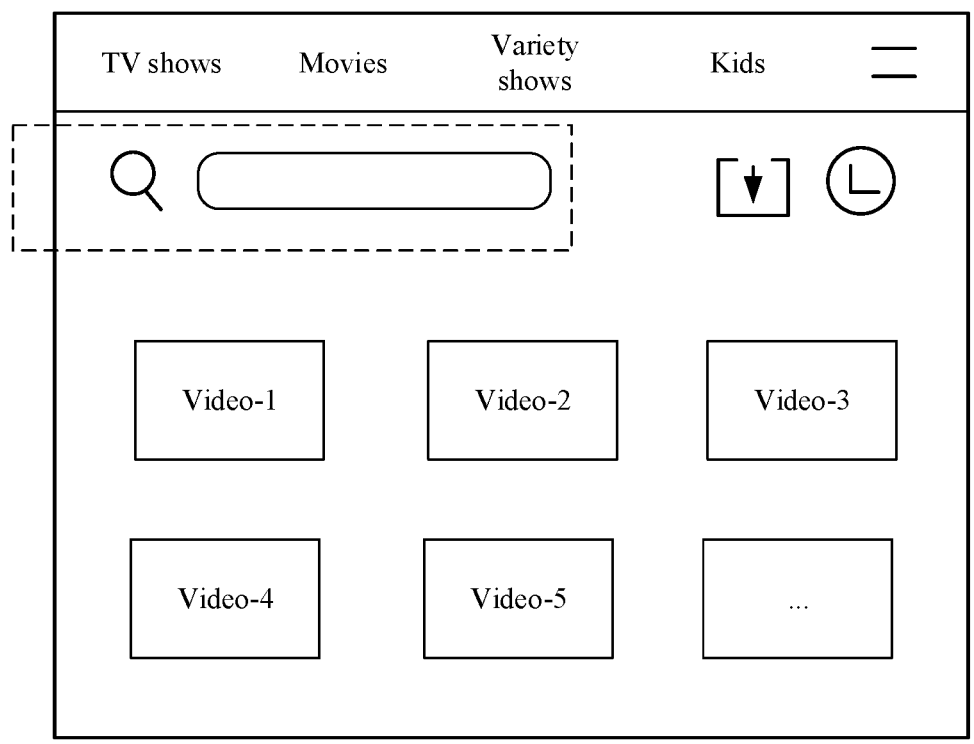
FIG. 8a is a schematic diagram of a page of a video website according to an embodiment of this application.
Figure 8B:
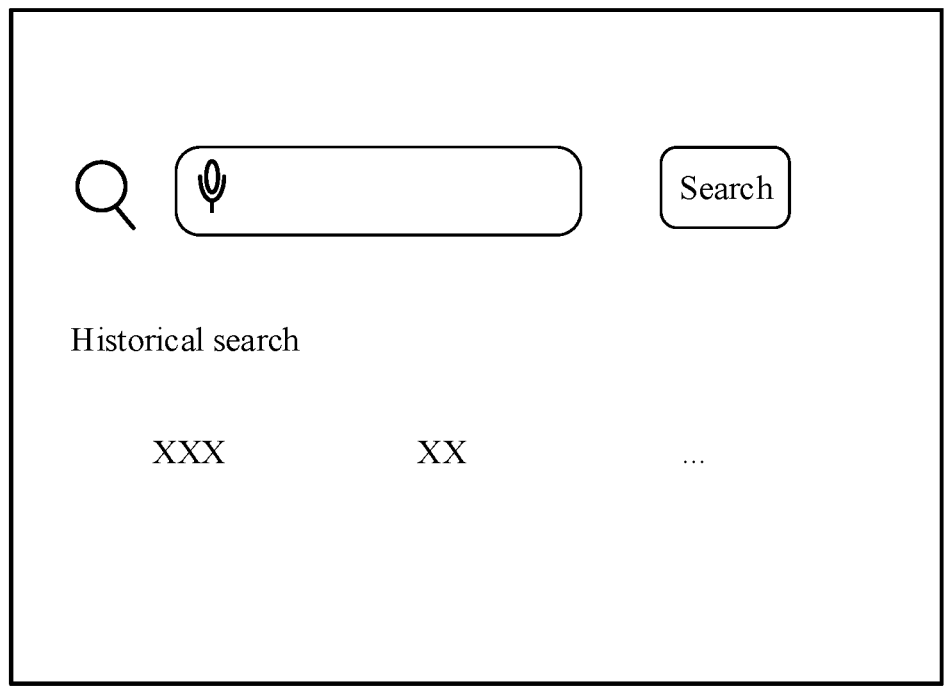
FIG. 8b is a schematic diagram of a video retrieval interface of a video website according to an embodiment of this application.

During actual application, the video processing system shown in FIG. 2 may be deployed on a backend server of a video website. The video processing system can predict and generate natural sentences with high description accuracy rates for all videos on the video website, thereby providing a high-quality video content understanding service (for example, a video retrieval service) for the video website. In an embodiment, the video website may provide a video retrieval entrance. Referring to FIG. 8a, the video website is provided with a video retrieval shortcut button (a dashed-line box part shown in FIG. 8a). When the video retrieval shortcut button is triggered (for example, clicked or selected), a video retrieval interface shown in FIG. 8b is entered. The video retrieval interface includes an input interface, and a user may input retrieval key information into the input interface, and clicks a "Search" button to initiate a video retrieval request. The video retrieval request carries the retrieval key information inputted by the user, so that a front end (for example, a browser client) of the video website transmits the video retrieval request to the backend server, and the backend server provides a video retrieval service to the user based on the video processing system shown in FIG. 2. Referring to FIG. 8b again, the input interface in the video retrieval interface may include a text input interface and a voice input interface. Retrieval key information inputted through the text input interface is a retrieval text. For example, the retrieval text is characters such as a keyword "roast" or "running". Retrieval key information inputted through the voice input interface is a retrieval audio. For example, the retrieval audio is voice appearing in a to-be-retrieved video uploaded by the user or an audio such as recorded voice of the user.

S402. Search a video database for a natural sentence matching the retrieval key information, the video database including a video and a natural sentence corresponding to the video, and the natural sentence corresponding to the video being obtained through processing by using the video processing method for generating a natural sentence.

The video database includes all the videos on the video website. Specifically, the video database includes at least one video category, at least one video in each video category, and a natural sentence corresponding to each video. The natural sentence corresponding to each video is obtained through prediction by the video processing system. The natural sentence corresponding to each video is obtained through processing by using the video processing method for generating a natural sentence. The video database may be represented by the following table:

TABLE 1

| Video database | | |
|---|---|---|
| Video | Video category | Natural sentence |
| Video-1 | TV shows | Natural sentence 1 |
| Video-2 | Movies | Natural sentence 2 |
| Video-3 | Variety shows | Natural sentence 3 |
| ... | ... | ... |

Video categories may be set by the video website according to various attributes. For example, video categories shown in Table 1 may be set according to content attributes. Alternatively, video categories such as Chinese mainland, Hong Kong & Taiwan, Europe & US, and Japan & Korea may be set according to regional attributes. Each video category includes a tag set. The tag set may include a plurality of tags, and the tags may be content tags of videos in the video category, tags manually set on the backend, comment tags of users, or the like. In the video database, the videos may be categorized according to a natural sentence of each video. Specifically, a natural sentence of a video is sequentially formed by a plurality of words, so that the natural sentence of the video may be indicated by a word set. For example, the natural sentence 1 corresponding to the Video-1 may be represented by {word 1, word 2, ..., word n}. Because each video category has a corresponding tag set, the videos may be categorized by calculating matching degrees between word sets corresponding to natural sentences of the videos and tag sets of the video categories.

As described above, the retrieval key information may include a retrieval text or a retrieval audio. In an embodiment, if the retrieval key information is a retrieval text, the retrieval text may be alternatively represented by a keyword set in practice, and may be represented by {keyword 1, keyword 2, ..., and keyword n}. For example, the retrieval text includes the characters "roast" and "running", and a keyword set corresponding to the retrieval text is {roast, running}. In this case, similarities between the keyword set and the word sets corresponding to the natural sentences of the videos shown in Table 1 may be separately calculated. If a similarity between the keyword set and a word set corresponding to a natural sentence is greater than a preset threshold, it indicates that the two sets match. Otherwise, the two sets do not match. In this way, one or more natural sentences matching the retrieval key information may be found from the video database.

In an embodiment, in a case that the retrieval key information is a retrieval audio, for convenience of subsequent processing, an audio-to-text technology may be first used, to convert the retrieval audio into a retrieval text. One or more natural sentences matching the retrieval key information may then be found from the video database according to a matching method in the foregoing implementation. This implementation may be used to help the visually impaired perform video retrieval, thereby improving the intelligence and practicality of a video retrieval function of the video website.

S403. Obtain a matching video corresponding to the natural sentence matching the retrieval key information.

S404. Output the matching video.

Figure 8C:
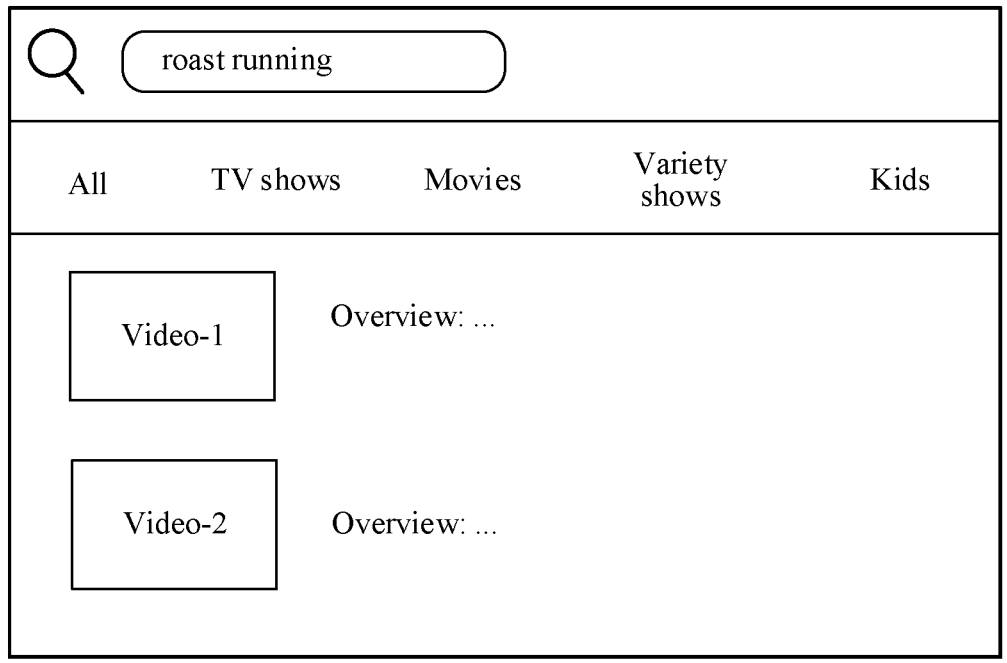
FIG. 8c is a schematic diagram of a retrieval result interface of a video website according to an embodiment of this application.

In steps S403 and S404, for example, assuming that a similarity between the retrieval key information and the natural sentence 1 is greater than the preset threshold, and a similarity between the retrieval key information and the natural sentence 2 is also greater than the preset threshold, the retrieval key information matches the natural sentence 1 and also matches the natural sentence 2. Therefore, it may be obtained according to Table 1 that matching videos include Video-1 and Video-2. Further, as shown in a retrieval result interface in FIG. 8c, the matching videos Video-1 and Video-2 are displayed in the retrieval result interface. It may be understood that, there may be one or more matching videos. When outputted, the matching videos may be outputted in descending order of similarities between natural sentences of the matching videos and the retrieval key information or may be outputted in random order.

In this embodiment of this application, a natural sentence with a higher accuracy rate can be predicted for a video based on an optimized framework of a video processing system, and a matching video meeting a video retrieval requirement is obtained according to the natural sentence, thereby providing a high-quality video retrieval service to a user, and improving the intelligence and practicality of the video processing system.

Figure 9:
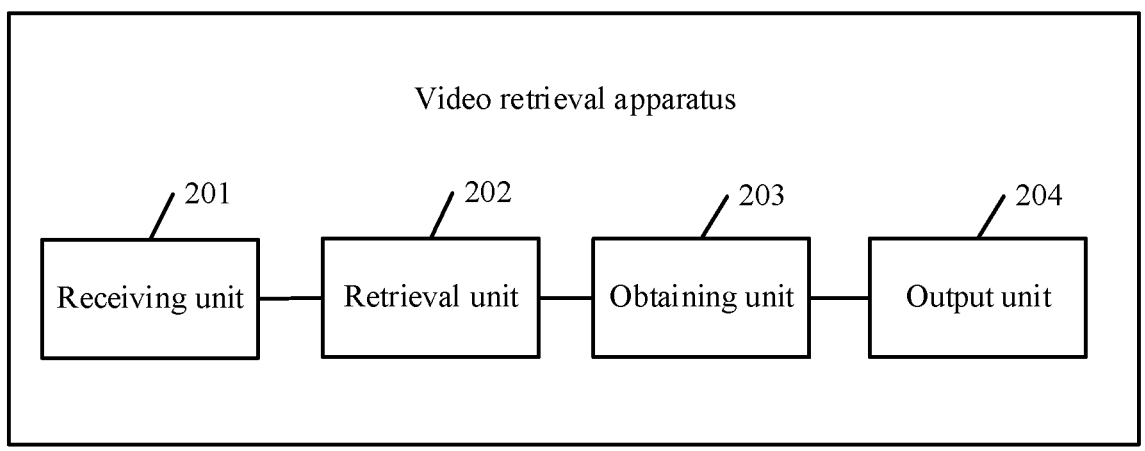
FIG. 9 is a schematic structural diagram of a video retrieval apparatus according to an embodiment of this application.

Based on the video retrieval method shown in the foregoing embodiment, an embodiment of this application further provides a video retrieval apparatus. The video retrieval apparatus may be a computer program (including program code) run on a server. The video retrieval apparatus may be applied to the video retrieval method in the embodiment shown in FIG. 7, so as to perform the steps in the video retrieval method. Referring to FIG. 9, the video retrieval apparatus runs the following units:

a receiving unit 201, configured to receive a video retrieval request, the video retrieval request carrying retrieval key information;

a retrieval unit 202, configured to search a video database for a natural sentence matching the retrieval key information, the video database including a video and a natural sentence corresponding to the video, and the natural sentence corresponding to the video being obtained through processing by using the video processing apparatus for generating a natural sentence;

an obtaining unit 203, configured to obtain a matching video corresponding to the natural sentence matching the retrieval key information; and an output unit 204, configured to output the matching video.

According to an embodiment of this application, steps S401 to S404 involved in the video retrieval method shown in FIG. 7 may be performed by the units in the video retrieval apparatus shown in FIG. 9. For example, steps S401, S402, S403, and S404 shown in FIG. 7 may be respectively performed by the receiving unit 201, the retrieval unit 202, the obtaining unit 203, and the output unit 204 shown in FIG. 9.

According to another embodiment of this application, units in the video retrieval apparatus shown in FIG. 9 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. During actual application, a function of one unit may be implemented by a plurality of units, or functions of a plurality of units are implemented by one unit.

In other embodiments of this application, the video retrieval apparatus may also include other units. During actual application, the functions may also be cooperatively implemented by other units and may be cooperatively implemented by a plurality of units.

In this embodiment of this application, a natural sentence with a higher accuracy rate can be predicted for a video based on an optimized framework of a video processing system, and a matching video meeting a video retrieval requirement is obtained according to the natural sentence, thereby providing a high-quality video retrieval service to a user, and improving the intelligence and practicality of the video processing system.

Figure 10:
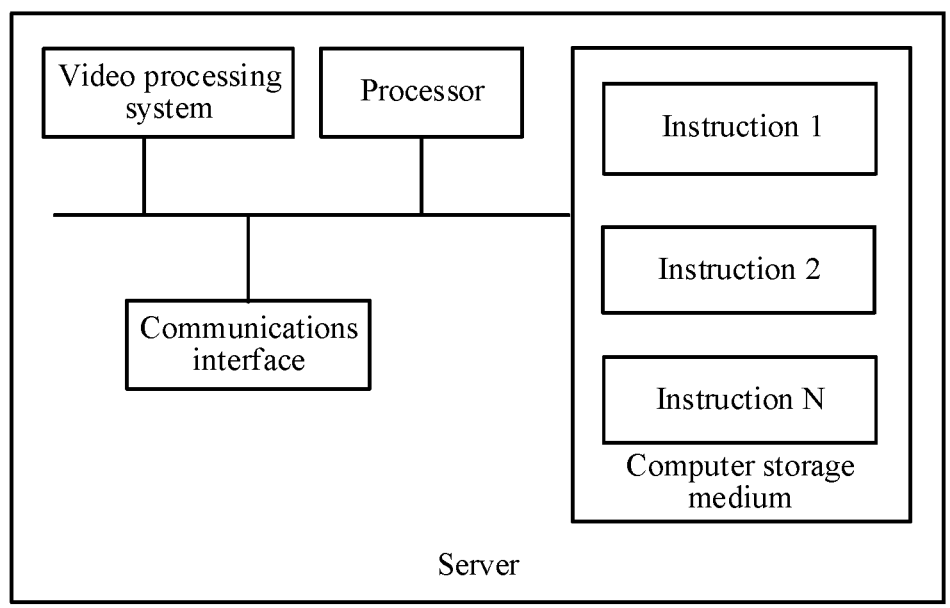
FIG. 10 is a schematic structural diagram of a server according to an embodiment of this application.

Based on the video processing system, the video processing method, and the video retrieval method shown in the foregoing embodiments, an embodiment of this application further provides a server, and the server may be a backend server of a video website. Referring to FIG. 10, an internal structure of the server at least includes the video processing system shown in FIG. 2, that is, includes an encoder, a decoder, and a reconstructor. Further, the interior of the server further includes a processor, a communications interface, and a computer storage medium. The processor, the communications interface, and the computer storage medium of the server may be connected by a bus or in other manners. In FIG. 10 in this embodiment of this application, a bus connection is used as an example.

The communications interface is a medium implementing interaction and information exchange between the server and an external device (for example, a terminal device). The processor (or referred to as a central processing unit (CPU)) is a computing core and a control core of the server, is suitable for implementing one or more instructions, and is specifically suitable for loading and executing one or more instructions to implement a corresponding method procedure and a corresponding function. In an implementation of this embodiment of this application, the processor is configured to: control the video processing system to perform encoding and decoding processing on an original video, reconstruct a target video, obtain a difference between the target video and the original video, optimize the framework of the video processing system according to the difference, and the like. In another implementation of this embodiment of this application, the processor is configured to: search a video database for a matching natural sentence according to retrieval key information carried in a video retrieval request, obtain and output a matching video corresponding to the matching natural sentence, and the like. The non-transitory computer storage medium is a memory device in the server and is configured to store programs and data. The computer storage medium herein may include an internal storage medium of the server and may also include an expanded storage medium supported by the server. The computer storage medium provides a storage space, storing an operating system of the server. In addition, the storage space further stores one or more instructions are suitable for being loaded and executed by the processor, and the instructions may be one or more computer programs (including program code). The computer storage medium herein may be a high speed random access memory (RAM) or a non-transitory memory, for example, at least one magnetic disk memory. Optionally, the computer storage medium may further be at least one computer storage medium located away from the foregoing processor.

In an embodiment, the computer storage medium stores one or more first instructions. The processor loads and executes the one or more first instructions stored in the computer storage medium, to implement corresponding steps in the method procedures shown in FIG. 3 to FIG. 5. During specific implementation, the one or more first instructions in the computer storage medium are loaded and executed by the processor to perform the following steps: performing encoding and decoding processing on an original video by using an encoder and a decoder, to obtain a video feature of the original video and a hidden state of the original video at a decoding stage; reconstructing a video feature of a target video by using a reconstructor according to the hidden state of the original video at the decoding stage; obtaining a difference between the video feature of the target video and the video feature of the original video; and adjusting a processing parameter of at least one of the decoder and the reconstructor according to the difference, to reduce the difference.

In an embodiment, in a process in which the processor loads the one or more first instructions in the computer storage medium to perform the step of performing encoding and decoding processing on an original video by using an encoder and a decoder, to obtain a video feature of the original video and a hidden state of the original video at a decoding stage, the processor specifically performs the following steps: invoking the encoder to extract frame features of the original video; combining the extracted frame features according to a time sequence of video frames of the original video, to generate the video feature of the original video; obtaining hidden states of the decoder at a plurality of decoding moments; and combining the obtained hidden states at the plurality of decoding moments according to a time sequence of the decoding moments, to obtain the hidden state of the original video at the decoding stage.

In an embodiment, in a process in which the processor loads the one or more first instructions in the computer storage medium to perform the step of obtaining hidden states of the decoder at a plurality of decoding moments, the processor specifically performs the following steps: integrating the frame features in the video feature of the original video based on an average feature mechanism or a temporal attention mechanism at each decoding moment, to obtain an integrated feature; and invoking the decoder to perform decoding processing on the integrated feature, to obtain the hidden states of the decoder at the plurality of decoding moments.

In an embodiment, the video feature of the target video includes a global feature of the target video. In a process in which the processor loads the one or more first instructions in the computer storage medium to perform the step of reconstructing a video feature of a target video by using a reconstructor according to the hidden state of the original video at the decoding stage, the processor specifically performs the following steps: applying an average feature mechanism to the hidden state of the original video at the decoding stage, to obtain corresponding global expression information; and invoking the reconstructor to reconstruct the global feature of the target video according to the global expression information and the hidden state of the original video at the decoding stage.

In an embodiment, in a process in which the processor loads the one or more first instructions in the computer storage medium to perform the step of obtaining a difference between the video feature of the target video and the video feature of the original video, the processor specifically performs the following steps: calculating a first Euclidean distance between the global feature of the target video and the video feature of the original video; constructing a global loss function of the reconstructor according to the first Euclidean distance; obtaining a loss function of the decoder; constructing a global difference function according to the loss function of the decoder and the global loss function of the reconstructor; and determining the difference between the video feature of the target video and the video feature of the original video according to the global difference function.

In an embodiment, the video feature of the target video includes local features of the target video. In a process in which the processor loads the one or more first instructions in the computer storage medium to perform the step of reconstructing a video feature of a target video by using a reconstructor according to the hidden state of the original video at the decoding stage, the processor specifically performs the following steps: applying a temporal attention mechanism to a hidden state of the decoder at each decoding moment, to obtain corresponding local expression information; and invoking the reconstructor to reconstruct the local features of the target video according to the local expression information and the hidden state of the decoder at each decoding moment.

In an embodiment, in a process in which the processor loads the one or more first instructions in the computer storage medium to perform the step of obtaining a difference between the video feature of the target video and the video feature of the original video, the processor specifically performs the following steps: calculating second Euclidean distances between the local features of the target video and the video feature of the original video; constructing a local loss function of the reconstructor according to the second Euclidean distances; obtaining a loss function of the decoder; constructing a local difference function according to the loss function of the decoder and the local loss function of the reconstructor; and determining the difference between the video feature of the target video and the video feature of the original video according to the local difference function.

In an embodiment, in a process in which the processor loads the one or more first instructions in the computer storage medium to perform the step of adjusting a processing parameter of at least one of the decoder and the reconstructor according to the difference, to reduce the difference, the processor specifically performs the following steps: optimizing and updating the processing parameter of the decoder according to the difference; and/or optimizing and updating the processing parameter of the reconstructor according to the difference.

In an embodiment, the processor loads the one or more first instructions in the computer storage medium to perform the following steps: determining words corresponding to the original video by using the decoder according to the hidden state of the original video at the decoding stage; and combining the words according to the time sequence of the decoding moments by using the decoder to form a natural sentence used for describing the original video.

In this embodiment, forward information from video content to a natural sentence is used to perform encoding and decoding processing on an original video to obtain the natural sentence, backward information from the natural sentence to the video content is used to obtain a video feature of the original video and a hidden state of the original video at a decoding stage to reconstruct a target video, and the framework of a video processing system is optimized based on a difference between the target video and the original video. In this way, a process of generating a natural sentence is constrained by obtaining bilateral information between video content and the natural sentence, so that a description accuracy rate of the natural sentence is improved, and the quality of the video content understanding service is optimized.

In an embodiment, the computer storage medium stores one or more second instructions. The processor loads and executes the one or more second instructions stored in the computer storage medium, to implement corresponding steps in the method procedure shown in FIG. 7. During specific implementation, the one or more second instructions in the computer storage medium are loaded and executed by the processor to perform the following steps: receiving a video retrieval request, the video retrieval request carrying retrieval key information; searching a video database for a natural sentence matching the retrieval key information, the video database including a video and a natural sentence corresponding to the video, and the natural sentence corresponding to the video being obtained by performing the video processing apparatus for generating a natural sentence; obtaining a matching video corresponding to the natural sentence matching the retrieval key information; and outputting the matching video.

In an embodiment, the retrieval key information includes a retrieval text or a retrieval audio. In a case that the retrieval key information is a retrieval audio, before the processor loads the one or more second instructions in the computer storage medium to perform the step of searching a video database for a natural sentence matching the retrieval key information, the processor further performs the following step: converting the retrieval audio into a retrieval text.

In an embodiment, this application provides a non-transitory computer-readable storage medium storing computer-readable instructions, the computer-readable instructions, when executed by one or more processors, causing the one or more processors to perform operations in the foregoing video processing method and/or video retrieval method. The operations in the video processing method and the video retrieval method herein may be steps in the foregoing video processing method and/or video retrieval method in the embodiments.

In an embodiment, this application provides a server including a memory and a processor, the memory storing computer-readable instructions, and the computer-readable instructions, when executed by the processor, causing the processor to perform operations in the foregoing video processing method and/or video retrieval method. The operations in the video processing method and the video retrieval method herein may be steps in the foregoing video processing method and/or video retrieval method in the embodiments.

In this embodiment, a natural sentence with a higher accuracy rate can be predicted for a video based on an optimized framework of a video processing system, and a matching video meeting a video retrieval requirement is obtained according to the natural sentence, thereby providing a high-quality video retrieval service to a user, and improving the intelligence and practicality of the video processing system.

What is disclosed above is merely exemplary embodiments of this application, and certainly is not intended to limit the protection scope of this application. Therefore, equivalent variations made in accordance with the claims of this application shall fall within the scope of this application.

What is claimed is:

1. A video processing method, applied to a video processing system, the video processing system comprising an encoder, and a decoder, and the method comprising:

performing encoding and decoding on an original video by using the encoder and the decoder, to obtain a video feature of the original video and a hidden state of the decoder for the original video at a decoding stage, wherein the video feature of the original video and the hidden state of the decoder are both used to predict a natural sentence used for describing the original video in the decoding stage;

in addition to the decoding, reconstructing a video feature of a target video according to the hidden state of the decoder for the original video and the hidden state is used to predict the natural sentence used for describing the original video based on a deep neural network, wherein the original video is a video that is originally inputted into the encoder, and a target video is a restored new version of the original video according to information related to the natural sentence obtained through the decoding stage;

obtaining a difference between the video feature of the target video and the video feature of the original video; and adjusting a processing parameter in at least one of the decoding and the reconstructing to reduce the difference between the video feature of the target video and the video feature of the original video, wherein the video feature of the target video is different from the natural sentence used for describing the original video.

2. The method according to claim 1, wherein the performing encoding and decoding on an original video by using the encoder and the decoder, to obtain the video feature of the original video and the hidden state of the decoder for the original video at the decoding stage comprises:

invoking the encoder to extract frame features of the original video;

combining the extracted frame features according to a time sequence of video frames of the original video, to generate the video feature of the original video;

obtaining from the hidden states of the decoder for the original video at a plurality of decoding moments; and combining the obtained hidden states of the decoder for the original video at the plurality of decoding moments according to a time sequence of the decoding moments, to obtain a sequence of hidden states of the decoder for the original video at the decoding stage.

3. The method according to claim 2, wherein the obtaining from the hidden states of the decoder for the original video at a plurality of decoding moments comprises:

integrating the frame features in the video feature of the original video based on an average feature mechanism or a temporal attention mechanism at each decoding moment, to obtain an integrated feature; and invoking the decoder to perform decoding on the integrated feature and obtain the hidden states of the decoder for the original video at the plurality of decoding moments.

4. The method according to claim 1, wherein the video feature of the target video comprises a global feature of the target video, and the reconstructing the video feature in addition to the decoding, of a target video according to the hidden state of the decoder for the original video based on the deep neural network comprises:

applying an average feature mechanism to the hidden state of the decoder for the original video at the decoding stage, to obtain corresponding global expression information; and reconstructing the global feature of the target video according to the global expression information and the hidden state of the decoder for the original video at the decoding stage.

5. The method according to claim 4, wherein the obtaining the difference between the video feature of the target video and the video feature of the original video comprises:
calculating a first Euclidean distance between the global feature of the target video and the video feature of the original video;
constructing a global loss function for the reconstructing according to the first Euclidean distance;
obtaining a loss function of the decoder;
constructing a global difference function according to the loss function of the decoder and the global loss function for the reconstructing; and
determining the difference between the video feature of the target video and the video feature of the original video according to the global difference function.

6. The method according to claim 1, wherein the video feature of the target video comprises local features of the target video, and the reconstructing the video feature in addition to the decoding, of a target video according to the hidden state of the decoder for the original video based on the deep neural network comprises:
applying a temporal attention mechanism to a hidden state of the decoder for the original video at each decoding moment of the decoder stage, to obtain corresponding local expression information; and
reconstructing the local features of the target video according to the local expression information and the hidden state of the decoder for the original video at each decoding moment of the decoder stage.

7. The method according to claim 6, wherein the obtaining the difference between the video feature of the target video and the video feature of the original video comprises:
calculating second Euclidean distances between the local features of the target video and the video feature of the original video;
constructing a local loss function for the reconstructing according to the second Euclidean distances;
obtaining a loss function of the decoder;
constructing a local difference function according to the loss function of the decoder and the local loss function for the reconstructing; and
determining the difference between the video feature of the target video and the video feature of the original video according to the local difference function.

8. The method according to claim 1, further comprising:
determining words corresponding to the original video by using the decoder according to the hidden state of the decoder for the original video at the decoding stage; and
combining the words according to the time sequence of the decoding moments by using the decoder to form the natural sentence used for describing the original video.

9. A server, comprising a memory and a processor, the memory storing computer-readable instructions, and the computer-readable instructions, when executed by the processor, causing the processor to perform operations associated with a video processing system, the video processing system comprising an encoder, and a decoder, the operations including:
performing encoding and decoding on an original video by using the encoder and the decoder, to obtain a video feature of the original video and a hidden state of the decoder for the original video at a decoding stage, wherein the video feature of the original video and the hidden state of the decoder are both used to predict a natural sentence used for describing the original video in the decoding stage;
in addition to the decoding, reconstructing a video feature of a target video according to the hidden state of the decoder for the original video and the hidden state is used to predict the natural sentence used for describing the original video based on a deep neural network, wherein the original video is a video that is originally inputted into the encoder, and a target video is a restored new version of the original video according to information related to the natural sentence obtained through the decoding stage;
obtaining a difference between the video feature of the target video and the video feature of the original video; and
adjusting a processing parameter in at least one of the decoding and the reconstructing to reduce the difference between the video feature of the target video and the video feature of the original video,
wherein the video feature of the target video is different from the natural sentence used for describing the original video.

10. The server according to claim 9, wherein the performing encoding and decoding on an original video by using the encoder and the decoder, to obtain the video feature of the original video and the hidden state of the decoder for the original video at the decoding stage comprises:
invoking the encoder to extract frame features of the original video;
combining the extracted frame features according to a time sequence of video frames of the original video, to generate the video feature of the original video;
obtaining from the hidden states of the decoder for the original video at a plurality of decoding moments; and
combining the obtained hidden states of the decoder for the original video at the plurality of decoding moments according to a time sequence of the decoding moments, to obtain a sequence of hidden states of the decoder for the original video at the decoding stage.

11. The server according to claim 10, wherein the obtaining from the hidden states of the decoder for the original video at a plurality of decoding moments comprises:
integrating the frame features in the video feature of the original video based on an average feature mechanism or a temporal attention mechanism at each decoding moment, to obtain an integrated feature; and
invoking the decoder to perform decoding on the integrated feature and obtain the hidden states of the decoder for the original video at the plurality of decoding moments.

12. The server according to claim 9, wherein the video feature of the target video comprises a global feature of the target video, and the reconstructing the video feature in addition to the decoding, of a target video according to the hidden state of the decoder for the original video based on the deep neural network comprises:
applying an average feature mechanism to the hidden state of the decoder for the original video at the decoding stage, to obtain corresponding global expression information; and
reconstructing the global feature of the target video according to the global expression information and the hidden state of the decoder for the original video at the decoding stage.

13. The server according to claim 12, wherein the obtaining the difference between the video feature of the target video and the video feature of the original video comprises:
calculating a first Euclidean distance between the global feature of the target video and the video feature of the original video;
constructing a global loss function for the reconstructing according to the first Euclidean distance;
obtaining a loss function of the decoder;
constructing a global difference function according to the loss function of the decoder and the global loss function for the reconstructing; and
determining the difference between the video feature of the target video and the video feature of the original video according to the global difference function.

14. The server according to claim 9, wherein the video feature of the target video comprises local features of the target video, and the reconstructing the video feature in addition to the decoding, of a target video according to the hidden state of the decoder for the original video based on the deep neural network comprises:
applying a temporal attention mechanism to a hidden state of the decoder for the original video at each decoding moment of the decoder stage, to obtain corresponding local expression information; and
reconstructing the local features of the target video according to the local expression information and the hidden state of the decoder for the original video at each decoding moment of the decoder stage.

15. The server according to claim 14, wherein the obtaining the difference between the video feature of the target video and the video feature of the original video comprises:
calculating second Euclidean distances between the local features of the target video and the video feature of the original video;
constructing a local loss function for the reconstructing according to the second Euclidean distances;
obtaining a loss function of the decoder;
constructing a local difference function according to the loss function of the decoder and the local loss function for the reconstructing; and
determining the difference between the video feature of the target video and the video feature of the original video according to the local difference function.

16. The server according to claim 9, wherein the operations further comprise:
determining words corresponding to the original video by using the decoder according to the hidden state of the decoder for the original video at the decoding stage; and
combining the words according to the time sequence of the decoding moments by using the decoder to form the natural sentence used for describing the original video.

17. A non-transitory computer-readable storage medium, storing computer-readable instructions, the computer-readable instructions, when executed by one or more processors, causing the one or more processors to perform operations associated with a video processing system, the video processing system comprising an encoder, and a decoder, the operations including:
performing encoding and decoding on an original video by using the encoder and the decoder, to obtain a video feature of the original video and a hidden state of the decoder for the original video at a decoding stage, wherein the video feature of the original video and the hidden state of the decoder are both used to predict a natural sentence used for describing the original video in the decoding stage;
in addition to the decoding, reconstructing a video feature of a target video according to the hidden state of the decoder for the original video and the hidden state is used to predict the natural sentence used for describing the original video based on a deep neural network, wherein the original video is a video that is originally inputted into the encoder, and a target video is a restored new version of the original video according to information related to the natural sentence obtained through the decoding stage;
obtaining a difference between the video feature of the target video and the video feature of the original video; and
adjusting a processing parameter in at least one of the decoding and the reconstructing to reduce the difference between the video feature of the target video and the video feature of the original video,
wherein the video feature of the target video is different from the natural sentence used for describing the original video.

18. The non-transitory computer-readable storage medium according to claim 17, wherein the performing encoding and decoding on an original video by using the encoder and the decoder, to obtain the video feature of the original video and the hidden state of the decoder for the original video at the decoding stage comprises:
invoking the encoder to extract frame features of the original video;
combining the extracted frame features according to a time sequence of video frames of the original video, to generate the video feature of the original video;
obtaining from the hidden states of the decoder for the original video at a plurality of decoding moments; and
combining the obtained hidden states of the decoder for the original video at the plurality of decoding moments according to a time sequence of the decoding moments, to obtain a sequence of hidden states of the decoder for the original video at the decoding stage.

19. The non-transitory computer-readable storage medium according to claim 17, wherein the video feature of the target video comprises a global feature of the target video, and the reconstructing the video feature in addition to the decoding, of a target video according to the hidden state of the decoder for the original video based on the deep neural network comprises:
applying an average feature mechanism to the hidden state of the decoder for the original video at the decoding stage, to obtain corresponding global expression information; and
reconstructing the global feature of the target video according to the global expression information and the hidden state of the decoder for the original video at the decoding stage.

20. The non-transitory computer-readable storage medium according to claim 17, wherein the video feature of the target video comprises local features of the target video, and the reconstructing the video feature in addition to the decoding, of a target video according to the hidden state of the decoder for the original video based on the deep neural network comprises:
applying a temporal attention mechanism to a hidden state of the decoder for the original video at each decoding moment of the decoder stage, to obtain corresponding local expression information; and reconstructing the local features of the target video according to the local expression information and the hidden state of the decoder for the original video at each decoding moment of the decoder stage.

21. The non-transitory computer-readable storage medium according to claim 17, wherein the operations further comprise:

determining words corresponding to the original video by using the decoder according to the hidden state of the decoder for the original video at the decoding stage; and combining the words according to the time sequence of the decoding moments by using the decoder to form the natural sentence used for describing the original video.

* * * * *